US010662637B2

(12) United States Patent
Moran et al.

(10) Patent No.: US 10,662,637 B2
(45) Date of Patent: *May 26, 2020

(54) INCLINED PLATES FOR CSO

(71) Applicant: Fresh Creek Technologies, Inc., Cedar Grove, NJ (US)

(72) Inventors: Dennis R. Moran, Caldwell, NJ (US); Walter C. Trnka, Warrington, PA (US); Hans de Bruijn, Lancaster, PA (US); Dan Fajman, Channahon, IL (US)

(73) Assignee: FRESH CREEK TECHNOLOGIES, INC., Cedar Grove, NJ (US)

( * ) Notice: Subject to any disclaimer, the term of this patent is extended or adjusted under 35 U.S.C. 154(b) by 509 days.

This patent is subject to a terminal disclaimer.

(21) Appl. No.: 15/422,298

(22) Filed: Feb. 1, 2017

(65) Prior Publication Data
US 2017/0145678 A1    May 25, 2017

Related U.S. Application Data

(63) Continuation-in-part of application No. 14/062,700, filed on Oct. 24, 2013, now Pat. No. 9,695,584.
(Continued)

(51) Int. Cl.
*E03F 5/16* (2006.01)
*B01D 21/00* (2006.01)

(52) U.S. Cl.
CPC ............ *E03F 5/16* (2013.01); *B01D 21/0039* (2013.01); *B01D 21/0045* (2013.01);
(Continued)

(58) Field of Classification Search
CPC .............. B01D 21/006; B01D 21/0039; B01D 21/0042; B01D 21/0045; B01D 21/0006;
(Continued)

(56) References Cited

U.S. PATENT DOCUMENTS 236,585 A * 1/1881 Hemingway ........... E02B 7/205
405/95
2,868,384 A * 1/1959 Puddington ............ B01D 21/02
210/521
(Continued)

*Primary Examiner* — Lucas A Stelling
*Assistant Examiner* — Angel Olivera
(74) *Attorney, Agent, or Firm* — Husch Blackwell LLP; George S. Pavlik

(57) ABSTRACT

The subject disclosure is directed to a liquid purification assembly featuring an inclined cell separator located within a chamber. The separator features a plurality of plates oriented perpendicular between opposing spaced-apart substantially vertical weirs. The plurality of plates are substantially parallel to one another and extend longitudinally within the chamber. The first and second weirs can have a plurality of orifices extending therethrough between their front and rear surfaces. The chamber features an influent chamber, an effluent chamber and a sediment collection area along the bottom of the chamber below the cell separator. A net extending from the top edge of the first weir and over a portion of the cell separator is further provided. The assembly features a hinged baffle suspended below the bottom edge of the second weir.

22 Claims, 7 Drawing Sheets

Related U.S. Application Data

(60) Provisional application No. 61/718,083, filed on Oct. 24, 2012.

(52) U.S. Cl.
CPC ........ *B01D 21/0051* (2013.01); *B01D 21/006* (2013.01); *B01D 21/0087* (2013.01)

(58) Field of Classification Search
CPC ............ B01D 21/0015; B01D 21/0072; B01D 21/0087; B01D 21/02; B01D 21/2405; B01D 21/307; B01D 21/003; B01D 21/0057; B01D 21/2427; B01D 2201/48; B01D 2221/12; B01D 29/52; B01D 29/94; E03F 1/00; E03F 5/16; E03F 5/14; E03F 1/005; E03F 5/10; E03F 1/002; C02F 1/40; C02F 9/00; C02F 2103/001; C02F 2103/002; C02F 2103/005; C02F 1/24; C02F 2001/007; E02B 5/16; E02B 5/085

See application file for complete search history.

(56) References Cited

U.S. PATENT DOCUMENTS

| | | |
|---|---|---|
| 3,706,384 A | 12/1972 | Weijman-Hane |
| 4,388,190 A * | 6/1983 | Haddock ............ B01D 17/0211 210/522 |
| 4,957,628 A | 9/1990 | Schulz |
| 5,562,819 A | 10/1996 | Turner, Jr. et al. |
| 6,676,832 B2 | 1/2004 | de Bruijn et al. |
| 2003/0121846 A1 * | 7/2003 | Use .................... B01D 21/0012 210/521 |
| 2007/0095749 A1 * | 5/2007 | Komatsu ................ B01D 17/00 210/513 |
| 2009/0032448 A1 | 2/2009 | Kolb |

* cited by examiner

INCLINED PLATES FOR CSO

CROSS-REFERENCE TO RELATED APPLICATION

This application is a continuation-in-part, and thus claims the benefit of the filing date of U.S. application Ser. No. 14/062,700 filed Oct. 24, 2013 which claims priority to U.S. Provisional Application Ser. No. 61/718,083 filed Oct. 24, 2012. The entirely of these applications is hereby incorporated by reference in their entirety as if fully set forth herein.

FIELD OF INVENTION

Embodiments presented herein are directed to a water quality treatment device and in particular to a device for cleaning storm water that traps debris in storm water with replaceable netting while containing oil spills and settling sediment in self-cleaning settling inclined lamellae or cells above a collection bunker inside a chamber.

BACKGROUND OF THE INVENTION

U.S. Pat. No. 3,706,384 (384 patent) in claim 1 teaches the flow distribution through a plurality of inclined plates, lamellae or cells in parallel to each other by means of entering the water into the lowermost side of the plates, lamellae or cells and discharging the water at the uppermost portion of the inclined plates, lamellae or cells. The '384 patent teaches the extension of the lamellae or cells to limit horizontal flow across the inclined lamellae or cells, U.S. Pat. No. 6,676,832 ('832 patent) teaches the use of inclined lamellae among other structural features including a dual chamber configuration for the treatment of surface water run-off from a storm event.

U.S. Pat. No. 5,562,819 discloses a net to trap floatable debris matter from flowing water in a subterranean chamber having an inlet and an outlet for connection to an underground conduit such as a sewer or storm drain conduit. The apparatus further includes a sensing system for detecting and signaling when the net is full of debris. A multi-bag or netting system is further disclosed in which at least two nets or bags are in parallel such that one net may accommodate overflow when the other net or bag is being serviced to remove the trash from the apparatus. Some form of this disclosed apparatus would reduce the collection of the solids entry openings that lead to the settling surfaces of other device downstream from it.

Provisional patent application 61/603,393, (Confirmation No. 2368), filing date Feb. 27, 2012, discloses an arrangement of netting and inclined lamellae or cells that reverses the flow direction through the inclined cells from entry at the lower most section to the uppermost section of the inclined cells and discharges through dedicated orifices instead of over a weir.

In general, the above referenced prior art patents deal with the treatment of water in order to physically remove solids and/or trash from the inflow to release water for direct discharge or further treatment including filtering action or disinfection action, desalination action or biological media filters or surface filtration to remove dissolved solids, disinfect or otherwise improve the purity of the water. The means of solids removal is intended to be passive and entirely dependent on the gravity induced flow of the water through the apparatus. The dynamic forces are generated by the flow of the water either indirectly or directly aided by the force of gravity.

In the USA, surface water run-off quality is regulated by the Clean Water Act and affects the construction cost of any site improvement for which a "Storm water Permit" is required from the EPA. When it rains the natural terrain contours and area generate a flow volume and a flow intensity or a drain rate. The water flows to the passive water quality treatment device which in turn discharges to receiving waters, filters, basins, lakes, etc. Often the water treatment device must be located in a limited area because of the right of way conditions. Collection surfaces of the device are responsible for the pollutant separation from the water and in terms of removal efficiency; a device reaches high efficiency when more collection area can be placed above a given footprint.

Furthermore, it is cost efficient to use hydraulic performance indicators that promote low Reynolds Numbers which indicate laminar flow in a flow conduit and uninterrupted settling. It is also important to reduce device depth since excavation affects installation cost exponentially, especially in highly populated regions with high water tables, which is near the water edge and shore lines.

Functionally, it is important to reduce the water turbulence and head loss between the device inflow and outflow conduits. It would be very beneficial to have a device that enhances these efficiency concerns for the purification of drainage water in one self-contained device.

SUMMARY OF THE INVENTION

Embodiments of the present invention are directed to a self-contained water purification unit or device. According to such embodiments, the device can scrub storm water by trapping the floating and other debris in storm water with replaceable netting while containing oil spills and settling out of sediment in self-cleaning settling lamellae or cells above a collection bunker inside a chamber.

Bottom, side and ceiling walls form the chamber. The chamber is generally a rectangular box with internal components that are strategically located to receive the inflow and outflow of the storm water or surface water. At least one sidewall contains an inflow opening and one sidewall has an outflow opening. The ceiling may have an inlet grate for a single surface water inlet point and/or multiple access openings. The water surface is stationary and assumes the elevation of the outflow or exit pipe invert, except when flow enters the device through the inflow openings. The preferred embodiment of the device is an inline structure with a pipe entering and departing from opposite sidewalls, but other arrangements are able to be constructed where at least three walls contain inlet pipe openings and the ceiling contains an inlet grate to the interior of the chamber and one wall contains the outflow or exit pipe. Embodiments presented herein can further include disposing the cell separator assembly within an interior compartment of a concrete storm water detention or retention module having openings at the longitudinal ends or along the lateral sides.

The storm or surface water can enter the chamber and optionally flow into a net cavity of a net bag or netting. The net cavity and net surface respectively function as retention bag for trash solids and a release surface with openings for trashless passing of the water. The netting surface openings can be changed to target specific size solids for detention and removal from the device. The net cavity may contain sorption socks or blankets which absorb oil sheen from the water surface, but the socks or blankets are retained by the netting bag to prevent release through the outflow or exit pipe. The netting or net bag is supported by a support frame and grating surface and/or by the top of inclined lamellae or cells. The netting can extend above a dry weather flow weir separating the influent duct from the inclined lamellae and can further extend across at least a portion of a top surface of the inclined lamellae or cells to about 15.24 centimeters (six inches) from a vertical overflow.

The chamber contains the inclined cells or lamellae between the inlet pipe and outlet pipe and water flows from the inlet pipe over or through the inclined cells and closure baffle up in to an effluent duct and out the exit or outflow pipe. Thus, the water can follow a U-shaped flow pattern during dry-weather flow events and gently flows above the collected sediment that rests on the bottom wall of the chamber. The vertical inflow duct near the inflow pipe is separated from the inclined cells by a dry weather flow weir and the top edge of the inclined cells can extend substantially parallel to the flow or perpendicular to the weir wall. This elevation is also known as the dry weather flow weir elevation.

Embodiments disclosed herein further provide for a water purifying chamber. Such chamber can comprise a first chamber enclosure with a bottom, top and sidewalls, a water inlet permitting water to flow into the first chamber from a water source and a water exit permitting water to flow out of the first chamber no higher than the water inlet. According to such embodiments, a second chamber can be provided within the bottom portion of the first chamber where the entire second chamber is accessible from the water inlet across to the water exit. An inclined cell separator featuring a plurality of planar plates with substantially flat, smooth front and rear surfaces or ribbed surfaces can be located between the water inlet and the water exit wherein a top surface of the cell separator is level, or close to level, with the inverts of the inlet and exit and wherein a bottom surface of the cell separator is adjacent the second chamber to deposit suspended sediment in the water flow on the bottom wall. The top of the inclined plates can further be slightly elevated from the dry weather water level so as to enable debris to drain from the system in a dry condition A net at the water inlet can further be provided to receive inflowing water. The net can be substantially supported by a support frame and grating and/or the top surface of a portion of the inclined cell separator As presented herein, water can freely flow below and over the top surface of the inclined cell separator. The assembly can include a primary weir with an upper edge higher than the top surface of the inclined cell separator but below a top of a secondary weir to split the inflowing water below the primary weir and over the primary weir into the ribbed inclined cell separator. The secondary weir can feature an upper edge located higher than the upper edge of the primary weir to split inflowing water during a flow condition into the inclined cell separator and over the secondary weir to an exit pipe at the water exit. Alternatively, the secondary weir according to embodiments presented herein can extend to the top of the interior chamber so that water is restricted from cresting over the top of the weir during a heavy flow event. The primary and secondary weirs can include slots or orifices permitting water flow therethrough. The assembly can further include a solid or perforated hinged baffle below the secondary weir to control water flow below and through the inclined cell separator.

According to embodiments presented herein, when flow into the chamber intensifies during a high level storm event, the water level can rise and crest the primary dry weather flow weir. This weir is strategically located at an elevation to encourage the first flush flow through the inclined lamellae or cells. By approximation of the cresting portion of the water flow, the device can preserve the surface loading necessary to remove sediment particle sizes to meet the water quality standard of a given EPA rule. This cresting portion is able to reach the elevation of the overflow weir and crest this secondary weir until the water elevation exceeds the ceiling elevation. Thus, effectively, the water column can optionally flow through the net cavity to remove the floatables that exceed the predetermined net opening size. Then the water column is stratified in one to three layers depending on the flow intensity.

During a dry weather water flow condition, there is a bottom layer of the water column that can flow below the inclined cells. This water flow can occur, for example, when there is no rain event, but perhaps a lighter inflow of water from irrigation run-off, car wash-water or liquid spills from accidents that drain into the device. This normal water flow can exert a minimal pressure on the hinged baffle and does not facilitate closure thereof. Under these conditions, oil can float in the inflow duct or inlet pipe and sediment within the water settles on the bottom wall of the chamber.

During a more moderate or heavy water flow event, an intermediate layer of the water column flows downward or through the inclined lamellae or cells. This type of water flow occurs in the majority of all water flow events in a device life-cycle. The water quality flow follows the inclined lamellae and exits at the bottom or through the cells but then turns towards the hinged baffle. However, the water flow through the inflow duct or pipe and inclined cells can intensify and start to exert exceeding pressure on the hinged baffle. Yet the largest portion of the water flow travels through the inclined cells where it is exposed to a settling area and separation of sediment is facilitated.

The settled sediment continues to slide to the edge of each cell and drops off in to a sediment bunker cavity where it continues to settle to the bottom wall of the chamber. The success of continued settling of sediment that comes from the inclined cells and the prevention of wash-out requires the Q/A in the sediment bunker to be less than the Q/A in the inclined cells.

Washout of the collected sediment on the bottom wall must be avoided for the proper operation of the device or apparatus. The design goal is to insure the surface loading is less than the surface loading for the water quality flow through the inclined cells. Therefore, the following equation is applicable:

$$Q_{wq} \cdot A_{ic}^{-1} > Q_{dw} \cdot A_{cb}^{-1}$$

$Q_{wq}$=Water Quality flow in liter/min (gallon/min)
$A_{ic}$=horizontally projected settling area of the parallel operating inclined cells in m$^2$ (Ft$^2$)
$Q_{dw}$=dzy weather flow in liter/min (gallon/min)
$A_{cb}$=chamber bottom area in m$^2$ (Ft$^2$)

During flow conditions, the hinged baffle receives increasing pressure with the increasing water flow until it closes against the exit wall. The closed baffle and the restricted water flow causes back pressure that encourages the water in front of the secondary overflow weir to rise above the overflow weir. Thus, the elevation of the overflow weir can be critically dependent on the effluent pipe connection and size as well as the water quality design flow and the desired removal of sediment by the inclined cells.

During an excess water flow condition, a top layer of the water column can overflow the effluent weir. In storm water quality treatment this overflow can occur infrequently. During a water overflow condition the top layer of the water column typically contains the least sediment and the bottom layers the most. Although the surface loading by the inclined cells is higher than for the water quality flow they still facilitate settling of solid particles.

Embodiments of the present invention utilize inclined cells that can enhance the sediment removal efficiency by arranging the components in such a way that the hydraulic environment and gravity on suspended solids in the water flow is improved over prior art devices.

The lamellae and cells in prior art devices were parallel inclined plates and end closures to form the inclined cells. By contrast, according to embodiments disclosed herein, the direction of water flow in the inclined cells can be reversed when compared to prior art inclined cells where the settling action is used to separate particles that are denser than water. The reversal can cause concurrent settling because the direction of water flow is substantially equal to the settling direction of the particles. FIG. 4 shows the apparent benefit because the water velocity vector and settling- and self-cleaning vector of the sediment point to the same direction. FIG. 5 shows the counter-current condition in the prior art, causing a shearing condition between the water vector and the sediment vector. The shear force can induce turbulence and re-suspension of the sediment which is detrimental to the targeted separation goal.

This invention also discloses the use of parallel vertical dividers to improve full exposure of the water to the plate floor and avoid short circuiting of the water flow from the entry point to the exit orifice.

By comparison, it stands that the Reynolds number of an equal length cell at equal flow without ribs has a Reynolds number of 364 and the Reynolds number of ribbed cells is 244. Laminar water flow occurs when this number is below 400.

Theoretically, the Reynolds number could be balanced by increasing the flow rate by 48.8% in the ribbed cells. Prior art teaches the discharge of cleansed water at the top of the cell and sediment at the bottom of the cell. The new concurrent flow pattern must deal with this and the method is shown in drawing 1 and drawing 2. The ribbed cells in drawing I are overlapped as shown in drawing 2) view A. The water flows parallel to the floor and ribs of the cell and reaches the bottom and turns towards the orifice openings in the hinged orifice baffle. The triangular extension provides a continuous path for the sediment to slide towards the sediment bunker. The vertical ribs act like flow separators inside the cell section but in the triangular zone the ribs are approximately 25% of the rib height and protect the sediment from being in the flow path of the cleansed water which now flows perpendicular to the ribs towards the orifice openings. This innovation preserves mixing of the cleansed water with the settled sediment when the two streams change directions and would otherwise re-suspend the sediment as it departs from multiple parallel overlapping sedimentation cells to a singular conduit leading to the orifices. The design takes advantage of the gravity induced stratification of the water and the sediment. The lighter water flows near the cell ceiling and the sediment slides on the cell floor. The change in direction of the ceiling water minimally affects the continuation of the sliding sediment.

Because of the ribbed cells the traditional length to width ratio of about 2 to 1 can be maintained with shorter individual cells. The prior art U.S. Pat. No. 6,676,832 has a width of 76.2 centimeters (30 inch) and length of 136.2075 centimeters (53.625 inch). This invention has a width between the ribs of about 9.7536 centimeters (3.84 inches) and permits the cell length to be reduced, while maintaining equal length to width ration. E.g. a length of 17.4244 centimeters (6.86 inch) would balance the ratio, a saving of approximately 87%. This design additionally permits the vertical height of the inclined cells to be less than what is used in prior art which increases the passive storage volume of collected sediment while maintaining the same clearance between the cells and the sediment. This construction of the cells reduces the depth of the device and reduces the device cost, excavation and dewatering costs.

The cells also provide intermediate support to the cell floor and ceiling which permits larger spans across the cells without sacrificing the functionality of the inclined cells. The length of the cell assembly that runs parallel to the in- and outflow axis permits a matching net length and net length provides proportional net flow through area which extends its replacement life-cycle.

Absent any flow and a properly maintained sediment bed, the hinged baffle suspends vertically from the hinge and is close to neutrally buoyant to allow clay like sediment to slide off the effluent side surface. A fixed baffle would collect vast amounts of sediment and flow would seek the path of least resistance around the baffle edges. The hinged baffle provides access for maintenance equipment and personnel access to the chamber bottom.

BRIEF DESCRIPTION OF THE DRAWINGS

Embodiments of the present disclosure are described by way of following drawings pointing out the various details to the invention. The main features and advantages of the present disclosure will be better understood with the following descriptions, claims, and drawings, where:

DETAILED DESCRIPTION

While the invention disclosed herein is susceptible of embodiment in many different shapes and sizes, there are shown in the attached drawings, and described herein in specific detail, embodiments thereof with the understanding that the present disclosure is to be considered as an exemplification of the principles of the invention and is not intended to limit the invention to the specific embodiments illustrated.

The purification goal of the inclined cells is to remove as much sediment by means of exposure of the flowing water to settling area provided by the cells. This creates a condition where the relative movement of the settling particle and the encapsulating water separate. The water and the particle move "En Masse" as a closed cell and only the density difference facilitates relocation of the particle within the cell. There must be equality of this condition throughout the inclined cell settling device to preserve the settling performance and repeatability of the performance. By maintaining a constant pressure head and shaping matching the flow path length of all cells to its neighboring cells from the crest point of the dry-weather flow weir to the baffle, the Q/A relationship is substantially constant for all exposed cell areas. By producing a substantially uniform Q/A value, it is consistently possible to find the maximum particle size that will not exit the device and further predict the purity of the water for a surface overflow rate in liters per minute per square meter (lpm/m2) or gallons per minute per square foot (gpm/ft2) at specific water temperatures and particle densities and particle shape characteristics.

This invention is more efficient and cost effective than prior art assemblies because netting overlaps at least a portion of the settling cells and the settling cells overlap one another. Such a configuration results in the cells achieving laminar flow conditions having a relatively low Reynolds number and the cells having a concurrent settling feature, where distribution flows are equalized and constant head loss, and settled sediment and purified water is separated into two distinct flow regimes in a relatively shallow chamber assembly with relatively small foot print. Such characteristics are more favorable to sediment separation and removal as compared to more turbulent flow conditions generated by prior art assemblies characterized by flow conditions having a higher Reynolds number.

The system disclosed herein has been found to have a much smaller physical footprint as compared to an independent netting chamber followed by sedimentation chamber. The design disclosed herein has further been found to provide increased flow capacity from counter current inclined cell devices while having a reduced depth. Given the general rule that excavation affects cost to the square of the excavation depth, the innovation promises to substantially improve the way storm water is purified and deliver several cost reducing features.

Figure 1:
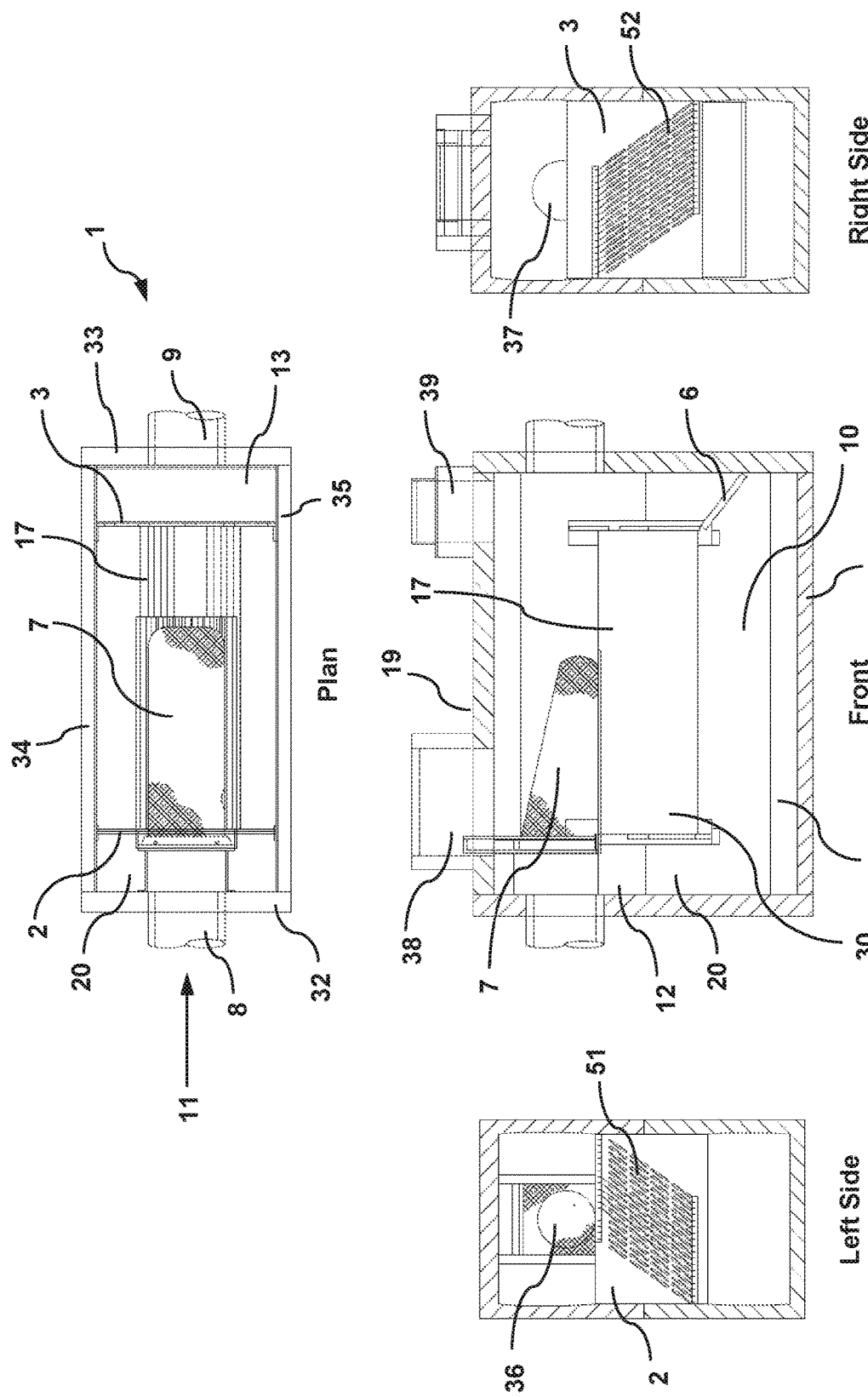
FIG. 1 shows plan, front, left side and right side of the chamber components of the water purifying invention.
Figure 2:
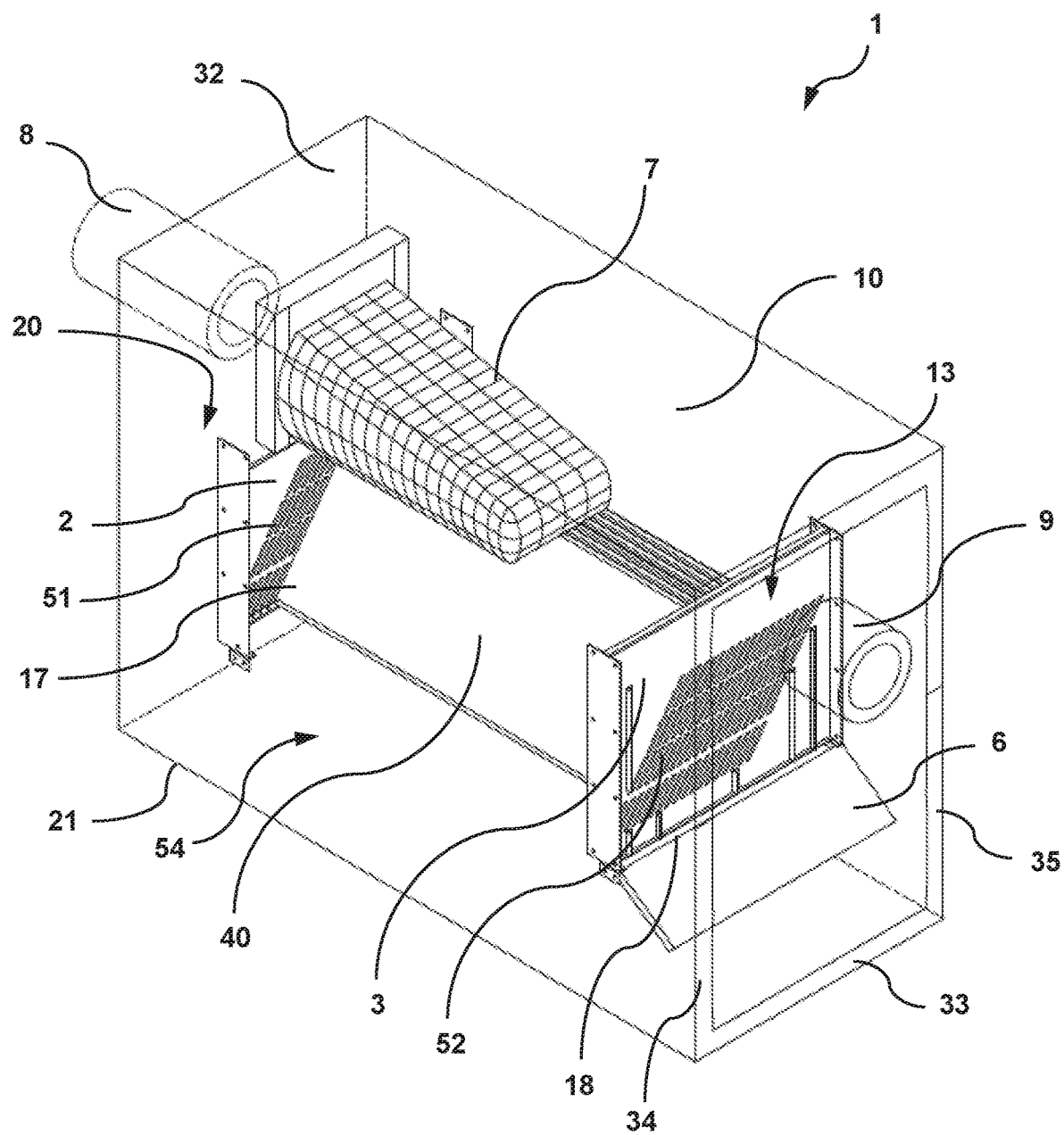
FIG. 2 shows a perspective of the assembly of FIG. 1.

FIG. 1 and FIG. 2 is a purification assembly 1 of the preferred embodiment featuring an inclined cell separator 17 inside an enclosure chamber 10 with entry 8 and exit 9 pipes on opposite ends. The chamber 10 can be formed by opposing end walls 32, 33, opposing side walls 34, 35, a ceiling or top 19 and a bottom 21. The opposing end walls 32, 33 can have influent and effluent openings 36, 37 respectively therein. Ceiling 19 can be near a finished grade elevation and have access opening(s) 38 above the dry weather flow influent chamber or duct 20 where oil 12 is collected in front of baffle or weir 2.

Above effluent chamber or duct 13 ceiling 19 can have an access opening 39 also. It is however possible to provide multiple openings in the ceiling 19 to reach areas above the cell separator 17. Bottom 21 can collect sediment 22 from flow 14 and 16. Net 7 can be secured to a support structure above the top edge of weir 2 and partially cover a top portion of inserted inclined cell separator 17 and this net 7 passes all influent water.

Inclined cell separator 17 can have a plurality of rectangular plates 40 positioned between the spaced-apart substantially vertical weirs 2, 3. Plates 40 can be substantially parallel to one another and extend longitudinally along at least a portion of the length of the chamber 10 between end walls 32, 33 and substantially perpendicular to opposing weirs 2, 3. Plates 40 can have opposing elongated top and bottom edges 42, 43 and substantially smooth front and rear surfaces 44, 45 therebetween. Plates 40 can have an inclined orientation relative a vertical axis with such orientation forming angled cells 46 between adjacent plates. The preferred embodiment of the insert is aluminum, but any configuration of plates, fabricated from metal or aluminum can be used, including ribbed plates comprised of fiberglass, which is reinforced decking from the commercial market.

Weirs 2, 3 can be substantially parallel to one another and have opposing top and bottom edges 47, 48 and front and rear surfaces 49, 50 therebetween. Weirs 2, 3 can further have a plurality of orifices 51, 52 extending therethrough between the front and rear surfaces 49, 50. Orifices 51, 52 can have a slotted shape and can be disposed in a regular pattern on weirs which corresponds to the direction of cells 46. Weir 2 can facilitate under and over flow of influent water 11 and can also partially detain oil 12 that stratifies in front of or within inclined cells separator 17 affixed to the rear side 45 of plate 2. Weir 3 can facilitate under and over flow and has inclined cells 46 mounted to the front surface 46 Influent chamber 20 can be located between the front 44 of weir 2 and end wall 32 having influent opening 36. Effluent chamber 13 can be located between the rear 45 of weir 3 and the effluent end wall 33 having effluent opening 37 that contains pipe 9. The relative size and position of cell separator assembly 17 and weir 2 affects distance h1, h2, and h3. Dimension h1 affects the degree of flow 14 directed below items 17 and 2, whereas h2 affects the flow 15 over weir 3 and the flow 16 through the inclined cell separator 17. In water quality treatment the goal is to expose the water quality flow to as much settling surface area as necessary to settle the desired particulates.

The size of h1 and h2 facilitates flow 14 below weir 2, as well as flow 16 through the inclined cells 17 and flow 15 over weir 3. Dimensions h3 and h2 facilitate the by-pass of flow 15 in excess of water quality flow and is permitted to exit untreated by the settling surfaces. Flow 53 and oil 12 is additionally permitted to move through orifices 49 of weir 2 and through the cells 46 of separator 17. Additionally, once inside the cells 46 of separator 17 and being subject to subject to sediment separation, liquid can flow 54 through orifices 50 of weir 3 and into effluent chamber 13.

Item 4 and 5 are stiffeners to provide structural integrity to plates 40 of the separator assembly 17. Solid baffle 6 can be suspended from the bottom edge 48 of weir 3 by hinge 18. During "No-flow" conditions, baffle 6, with hinge 18 can suspend baffle 6 in a substantially vertical position and provides maintenance access and flow opportunity below items 17, 2 and 3.

During flow conditions, baffle 6 can rotate upwards and closes against effluent wall 35 due to flow pressure. Such action restricts liquid from entering effluent chamber 13 from below weir 3 and facilitates water quality flow 16 upward through separator 17 in front of weir 3. As flow intensity increases the water level can rise to dimension h3 and dedicate the lower portion of the water column to treatment by separator 17. If high flow intensity continues or increases further the top portion of the water column can continue to rise in front of weir 3 and can flow over top of weir 3. Under such circumstances, such flow would only receive treatment from flowing through net 7.

This arrangement of components will avoid wash-out of previously settled sediment 22 on the bottom 21 of the enclosure chamber 10. With respect to water quality flow 16, it is generally the physical dimensions of h2 that affect the flow rate that will be exposed to the settling surface of item 1.

Figure 3:
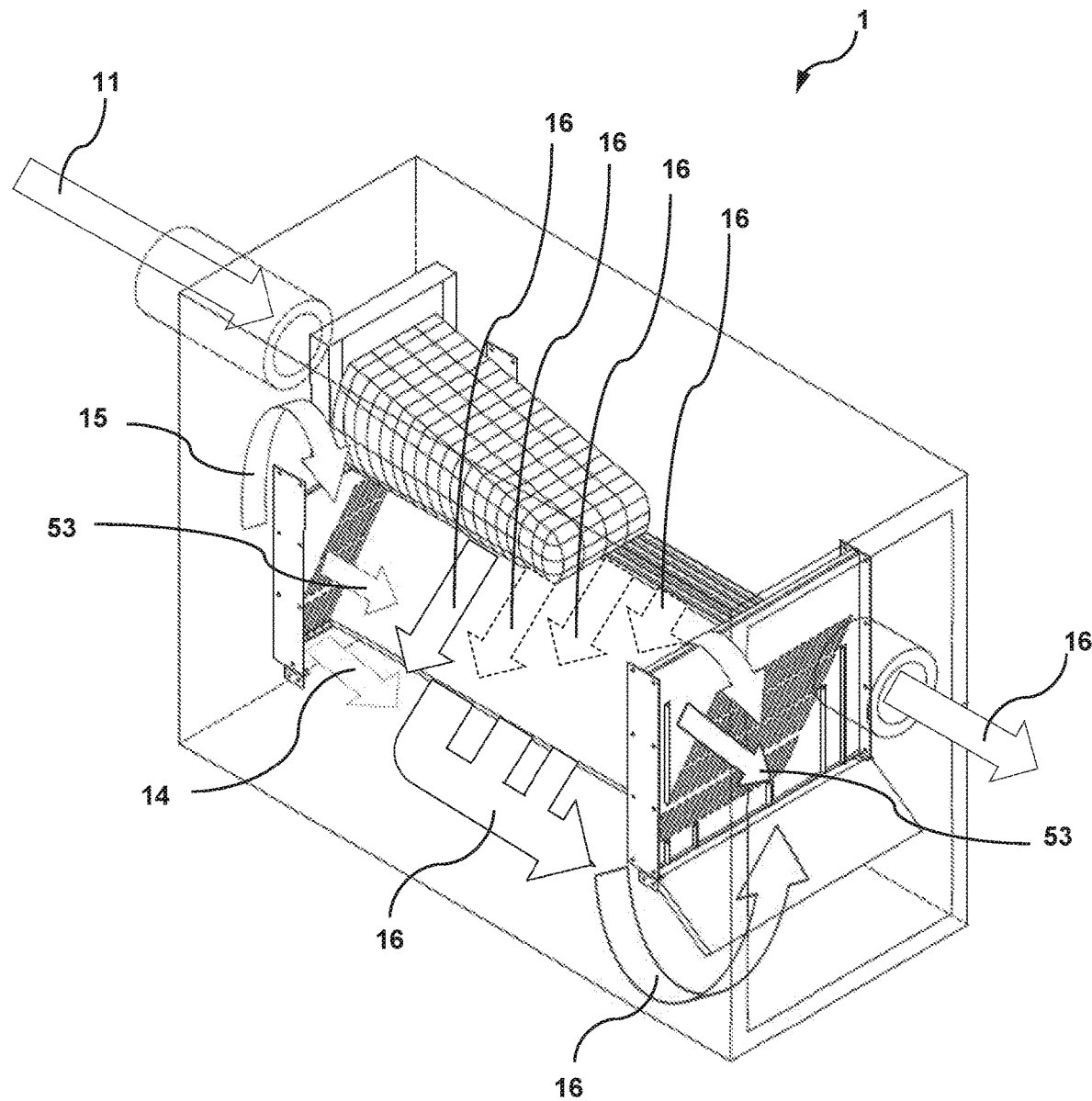
FIG. 3 shows a perspective of the assembly with the flow of sediment and cleansed water designated according to the invention of FIG. 1.
Figure 5:
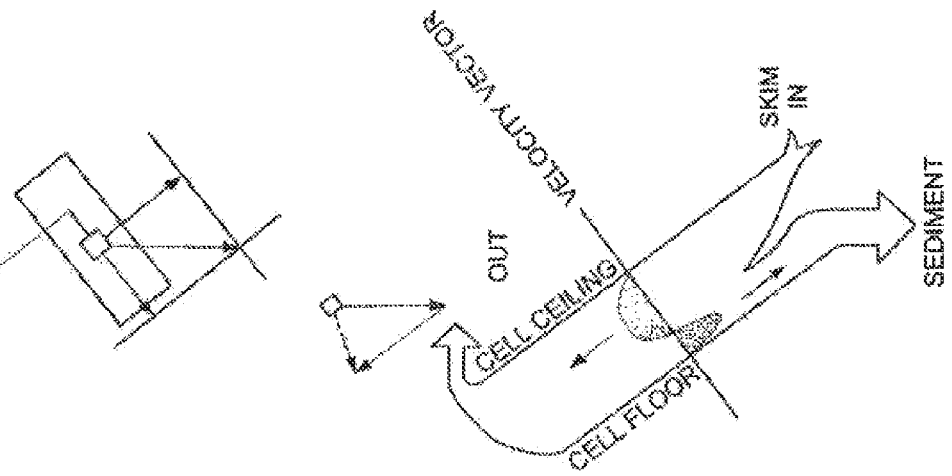
FIG. 5 shows a graphical view of counter-current flow of the prior art contrasting the con-current flow of sediment and water through the cells of the present invention of FIG. 1.
Figure 4:
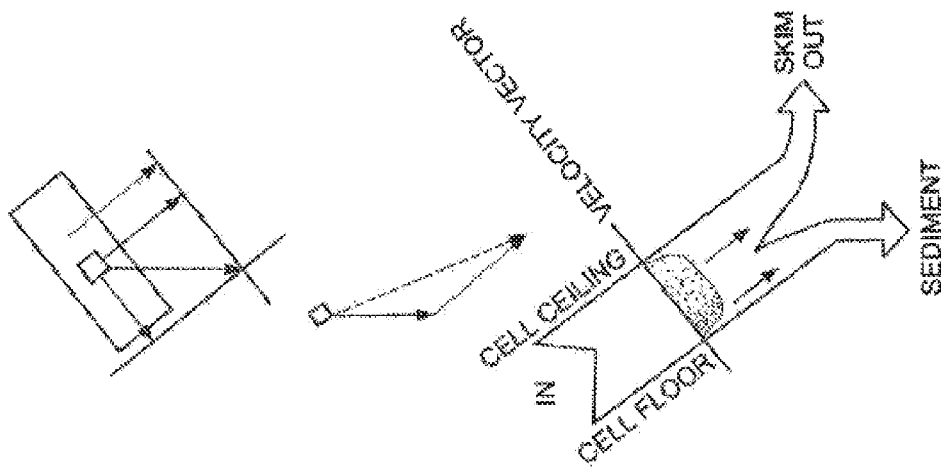
FIG. 4 shows a graphical view of con-current flow of sediment and water through the cells of the present invention of FIG. 1.
Figure 6:
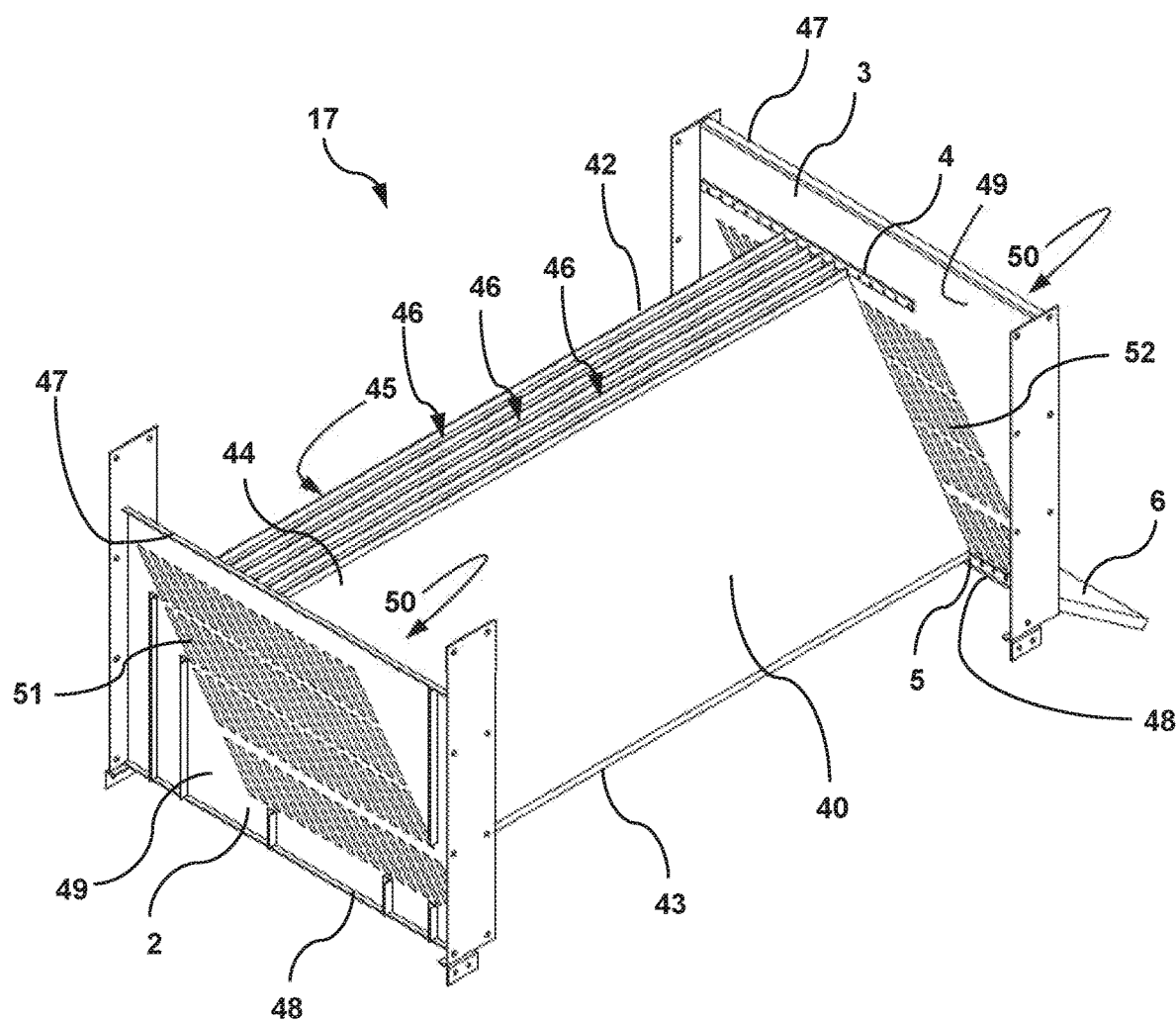
FIG. 6. shows a perspective view of the inclined cell separator with some of the plates removed according to embodiments presented herein.

FIG. 3 shows the specific design of the flow 11 entering the chamber 10 through influent opening 36. The majority of the flow can follow path 16 about the cell separator 17. Flow 16 can occur during most rain events and moves through net 7, over the top of weir 2 or through orifices 51, into the cells 46 of the separator assembly 17. The sediment discharge arrows S indicate the logical sinking path of the separated sediment which can collect as permanently removed sediment 22 along sediment collection area 54 on the bottom 21 of chamber 1 between chambers 13, 20.

The regular maintenance when using this invention is the inspection of the device for accumulated solids in net 7. Visual inspection of net 7 to check for collected mass or a water level sensor in pipe 8 and/or chamber 10 that reveals the pressure loss through net 7 remotely indicates the need for a net change out and removal of solids. The difference between empty water depth and measured distance from sediment level to water level can be representative of the sediment depth. Testing will indicate the acceptable depth under operating conditions that will limit wash-out of this collected sediment. During a clean-out event, the water column can stratify into three major layers; an oil sheen and fine floatable layer along the top, an intermediate water layer and a sediment layer at the bottom. Upon removal of the net 7 the floatable layer can be collected by a vacuum hose. The water can be decanted and discarded or stored temporarily. The sediment can be removed though the access openings 38, 39 in ceiling 19 by trained personnel that use vacuum equipment and spray nozzles to guide the sediment to the vacuum nozzle.

It is to be understood that the form of this invention as shown is merely a preferred embodiment. As defined in the following claims. For example, multiple sections of cell planking of the separator assembly 17 can be placed side by side in addition to being stacked on top of each other.

Figure 7:
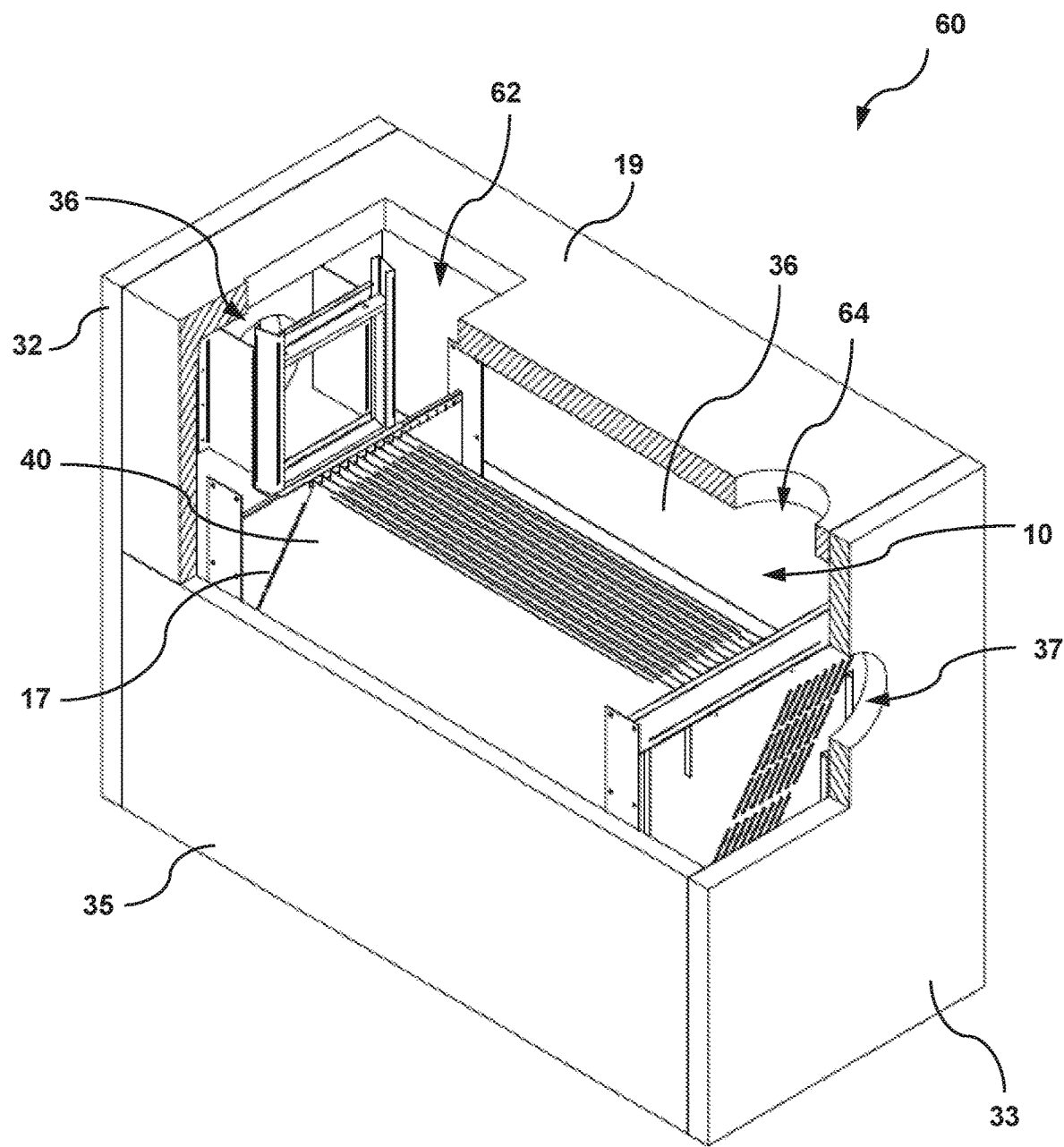
FIG. 7. shows a perspective view of the assembly within an interior compartment of a concrete storm water detention or retention module.

FIG. 7 illustrates the assembly 17 installed within an interior compartment 10 of a concrete storm water detention or retention module 60 according to an exemplary embodiment. As shown schematically in FIG. 7, assembly 17 can be disposed longitudinally within module 60 so that inclined plates 40 extend substantially parallel to side walls 34, 35 of module 60. Module 60 can further have openings 36, 37 through the longitudinal ends 32, 33 and openings 62, 64 through the top deck or ceiling 19. According to exemplary embodiments, module 60 can be formed of precast concrete and can be arranged adjacent other modules (not shown) as part of an underground retention/detention system for managing liquids such as storm water. It is generally known that such systems can accommodate runoff and prevent the pooling of water at a given site by diverting or storing water in an assembly of modules of the type shown in FIG. 7. According to the exemplary embodiment illustrated in FIG. 7, assembly 17 can be incorporated into the interior compartment 10 of one or more modules 60 to remove sediment and debris from the water moving through the system where liquid flows through the interior chamber in the longitudinal direction.

Figure 8:
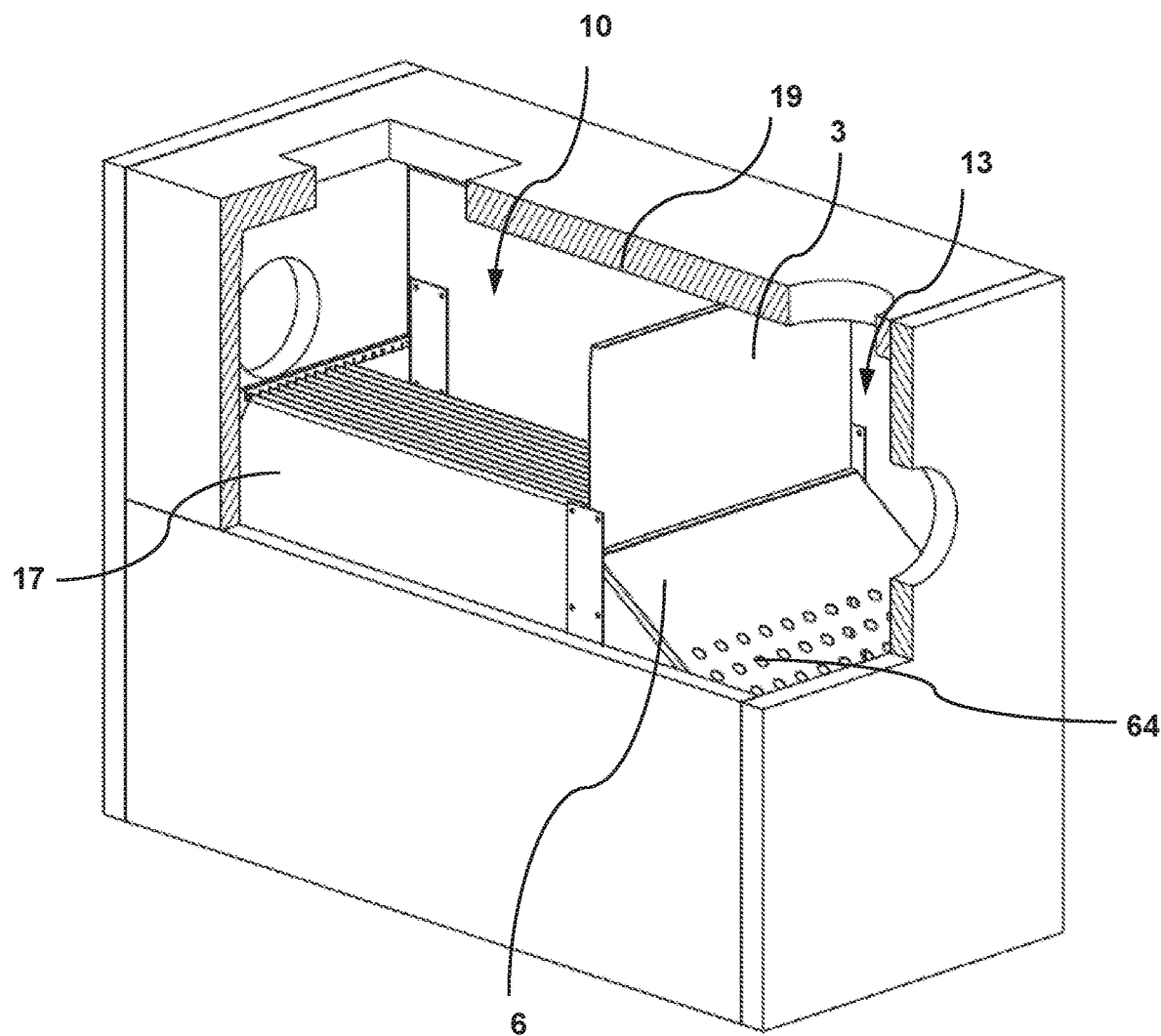
FIG. 8 shows a perspective view of a second exemplary assembly according to embodiments presented herein.

FIG. 8 illustrates a further exemplary embodiment of separator assembly 17 where the second weir 3 is solid and extends upward all the way to the ceiling 19 of interior chamber 10 and baffle 6 has a plurality of perforations 64 therethrough. The embodiment illustrated schematically in FIG. 8 has been found to decrease the probability of hydrocarbons passing through the system and thus can be utilized where additional oil capacity is desired. According to the embodiment illustrated in FIG. 8, water is restricted from cresting over secondary weir 3 during a heavy flow event. Instead, since the perforations 64 in baffle 6 are below the normal water line, the water can flow through the perforations 64 in hinged baffle 6 and into effluent chamber 13 before exiting the system. Accordingly, secondary weir 3 can trap hydrocarbons or other floatable material and prevent such buoyant substances from passing through the system.

What is claimed is:

1. A liquid purification assembly comprising:
    an inclined cell separator having a plurality of rectangular plates positioned between opposing spaced-apart substantially vertical weirs, the plurality of plates being substantially parallel with one another and extending substantially perpendicular to the opposing weirs, the plates having opposing elongated top and bottom edges and front and rear surfaces therebetween, the plates having an inclined orientation relative a vertical axis, said inclined orientation forming angled cells between adjacent plates of the plurality, the weirs comprising a first weir and a second weir being substantially parallel to one another, the first and second weirs having opposing top and bottom edges and front and rear surfaces therebetween;
    the inclined cell separator being located within a chamber formed by opposing end walls, opposing side walls, a top and a bottom, the opposing end walls comprising an influent wall having an influent opening therein and an effluent wall having an effluent opening therein, the first and second weirs extending between the opposing side walls of the chamber;
    an influent chamber between the influent wall and the first vertical weir;
    an effluent chamber between the second vertical weir and the effluent wall;
    a sediment collection area along the bottom of the chamber below the inclined cell separator and between the influent chamber and effluent chamber;
    a hinged baffle suspended below the bottom edge of the second vertical weir, the hinged baffle hanging in a substantially vertical position from the second weir during periods where liquid is not flowing into the chamber at a flow rate sufficient to produce upward rotation of the baffle, the hinged baffle being rotatable upward during periods where liquid flows into the chamber at a flow rate sufficient to push the hinged baffle towards the effluent wall whereupon the hinged baffle restricts liquid from entering the effluent chamber from the sediment collection area.

2. The assembly of claim 1 further comprising a net extending from the top edge of the first vertical weir and above at least a portion of the inclined cell separator.

3. The assembly of claim 1 where the top edge of the second weir is higher than the top edge of the first weir.

4. The assembly of claim 1 where the bottom edge of the first weir is elevated from the bottom of the chamber permitting liquid to pass underneath the first weir from the influent chamber into the sediment collection area below the inclined cell separator.

5. The assembly of claim 1 where the top of the cell separator is substantially horizontally level with inverts of the influent and effluent openings.

6. The assembly of claim 1 where the top edge of the first weir is higher than the top of the cell separator permitting substances floating on top of liquid in the influent chamber to be trapped in the influent chamber in front of the first weir.

7. The assembly of claim 1 where the top edge of the second vertical weir does not extend to the top of the chamber permitting liquid to flow over the second vertical weir into from an area above the cell separator to the effluent chamber.

8. The assembly of claim 1 where the plurality of plates of the cell separator are oriented at an angle of about one hundred forty five degrees relative a horizontal axis and fifty five degrees relative a vertical axis.

9. The assembly of claim 1 where adjacent plates of the plurality of plates of the cell separator are spaced apart from one another a distance of about 5.08 centimeters (two inches).

10. The assembly of claim 1 where individual plates of the plurality of plates have substantially identical dimensions and have a length of about 304.8 centimeters (one hundred twenty inches and a width of about 121.92 centimeters (forty eight inches).

11. The assembly of claim 1 where the plurality of plates of the cell separator are comprised of aluminum and have substantially smooth front and rear surfaces.

12. The assembly of claim 1 where the plurality of plates of the cell separator are comprised of fiberglass and have a ribbed surface.

13. The assembly of claim 1 where the first and second vertical weirs have a plurality of orifices extending between the first and second sides, the orifices having a slotted shape and being arranged in a pattern comprising a plurality of horizontal rows and a plurality of angled columns, the angled columns being substantially parallel to the inclined orientation of the plurality of plates.

14. The assembly of claim 1 where the top edge of the second vertical weir extends to the top of the chamber and is solid and the hinged baffle has a plurality of perforations therethrough.

15. A separator assembly comprising:
  a plurality of rectangular plates positioned between opposing spaced-apart substantially vertical weirs, the plurality of plates being substantially parallel with one another and extending substantially perpendicular to the opposing weirs, the plates having opposing elongated top and bottom edges and substantially smooth front and rear surfaces therebetween, the plates having an inclined orientation relative a vertical axis, said inclined orientation forming angled cells between adjacent plates of the plurality, the weirs comprising a first weir and a second weir being substantially parallel to one another, the first and second weirs having opposing top and bottom edges and front and rear surfaces therebetween, the first and second weirs having a plurality of orifices extending therethrough between the front and rear surfaces; and
  a solid hinged baffle suspended below the bottom edge of the second vertical weir, the hinged baffle hanging in a substantially vertical position from the second weir and being rotatable upward towards the rear surface of the second weir to restrict a liquid from flowing from an area below the separator assembly to an area behind the second weir.

16. The separator assembly of claim 15 further comprising a net extending from the top edge of the first vertical weir and above at least a portion of some of the plurality of rectangular plates.

17. The separator assembly of claim 15 where the orifices in the first and second vertical weirs have a slotted shape and are arranged in a pattern comprising a plurality of horizontal rows and a plurality of angled columns, the angled columns being substantially parallel to the inclined orientation of the plurality of plates.

18. The separator assembly of claim 15 where the plurality of plates are comprised of aluminum.

19. The separator assembly of claim 15 where individual plates of the plurality of plates have substantially identical dimensions and have a length of about 304.8 centimeters (one hundred twenty inches) and a width of about 121.92 centimeters (forty eight inches).

20. The separator assembly of claim 15 where adjacent plates of the plurality of plates are spaced apart from one another a distance of about 5.08 centimeters (two inches).

21. The separator assembly of claim 15 where the plurality of plates are oriented at an angle of about one hundred forty five degrees relative a horizontal axis and fifty five degrees relative a vertical axis.

22. The assembly of claim 15 where the top edge of the second weir is positioned above the top edge of the first weir.

* * * * *